United States Patent [19]
Yokoyama et al.

[11] Patent Number: 4,808,934
[45] Date of Patent: Feb. 28, 1989

[54] POSITION SENSOR FOR DETECTING ANGULAR POSITION

[75] Inventors: Toshio Yokoyama; Iwao Shimane; Tsuneo Konno, all of Saitama, Japan

[73] Assignee: Honda Giken Kogyo Kabushiki Kaisha, Tokyo, Japan

[21] Appl. No.: 27,831

[22] Filed: Mar. 19, 1987

[30] Foreign Application Priority Data

| Mar. 19, 1986 | [JP] | Japan | 61-40729[U] |
| Jun. 9, 1986 | [JP] | Japan | 61-86617[U] |
| Jun. 9, 1986 | [JP] | Japan | 61-86618[U] |
| Jun. 9, 1986 | [JP] | Japan | 61-86620[U] |

[51] Int. Cl.⁴ .............................................. G01B 7/30
[52] U.S. Cl. ................................... 324/208; 123/617; 123/146.5 A; 324/262
[58] Field of Search ............... 324/207, 208, 226, 251, 324/252, 260–262, 173, 174, 381, 385, 389, 402; 338/32 R, 321; 123/617, 146.5 A; 310/168

[56] References Cited

U.S. PATENT DOCUMENTS

| 4,053,826 | 10/1977 | Wasawa et al. | 324/208 |
| 4,223,249 | 9/1980 | Eshelman | 123/146.5 A X |
| 4,235,213 | 11/1980 | Jellissen | 123/146.5 A |
| 4,274,053 | 6/1981 | Ito et al. | 324/174 |
| 4,319,188 | 3/1982 | Ito et al. | 324/208 X |
| 4,401,944 | 8/1983 | Narimatsu et al. | 324/207 |
| 4,589,038 | 5/1986 | Radtke | 324/207 X |
| 4,599,561 | 7/1986 | Takahashi et al. | 324/252 X |
| 4,649,342 | 3/1987 | Nakamura | 324/252 X |

FOREIGN PATENT DOCUMENTS

| 0196619 | 10/1985 | Japan | 324/208 |
| 0214219 | 10/1985 | Japan | 324/208 |

*Primary Examiner*—Reinhard J. Eisenzopf
*Assistant Examiner*—Warren S. Edmonds
*Attorney, Agent, or Firm*—Lyon & Lyon

[57] ABSTRACT

A light, compact angle-of-rotation sensor is comprised of a magnetic ring within which resin is used to fix the ring to the periphery of a shaft. Formed on the magnetic ring are insets into which the resin enters, providing a strong bond between the resin and the magnetic ring. In addition, a key inset into the shaft provides a strong bond between the resin and the shaft. Magnetized zones are formed on the outer surface of the magnetic ring, and magneto electric transducer means are arranged in the proximity of these zones to face said zones, and the angle of rotation is detected from the changes in magnetism that accompany the rotation.

16 Claims, 9 Drawing Sheets

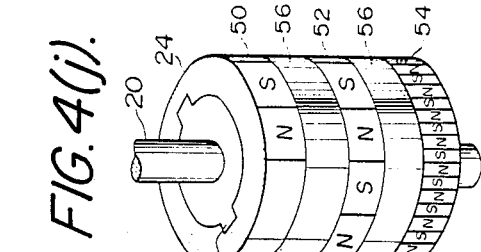
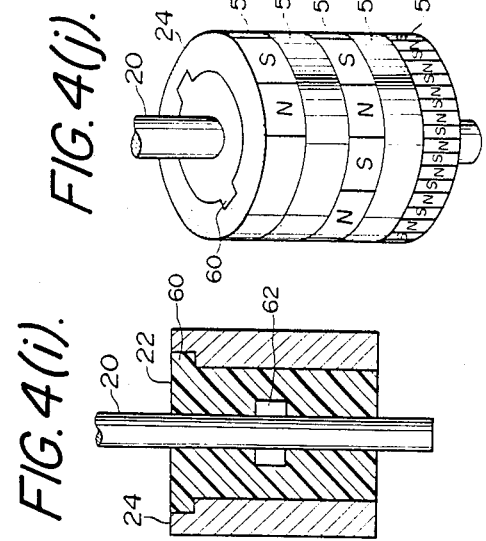
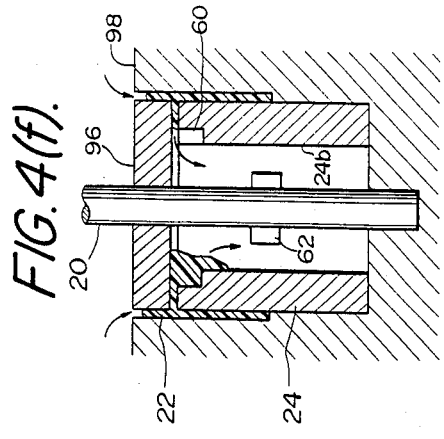
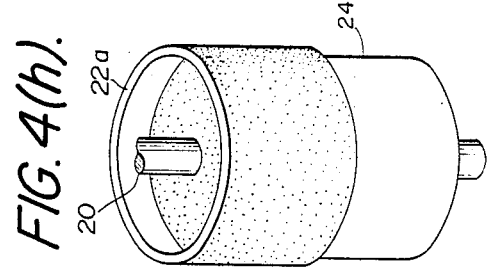
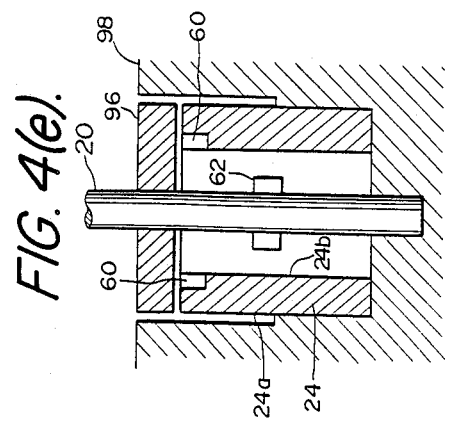
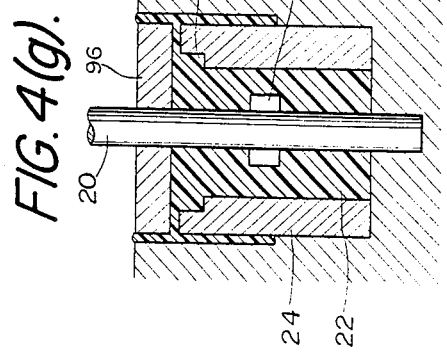

POSITION SENSOR FOR DETECTING ANGULAR POSITION

BACKGROUND OF THE INVENTION

1. Field of the Invention

This invention relates to an angle-of-rotation sensor for detecting the angle of rotation of a shaft. This invention particularly relates to an angle-of-rotation sensor for detecting the angle of rotation of the crankshaft of an internal combustion engine of an automobile or other such vehicle.

2. Description of the Prior Art

Recently, electronic control technology for internal combustion engines has been making rapid progress. With respect to such electronic control, control timing is important and as such it is necessary to detect with precision piston crank angle positions for use as reference signals. Conventional types of angle-of-rotation sensors include, for example, the type disclosed in Japanese Laid-open Patent Publication No. 57(1982)-133311. In this conventional technology rotating member is formed by stacking three disk-shaped magnets one on top of the other. Each of the magnets has magnetic poles formed contiguously around the periphery thereof, forming three arrays of magnetized zones.

However, because in this conventional type the rotating member is formed by the stacking of disk-shaped magnets, the rotating member becomes heavy, requiring that the diameter of the shaft be increased, with the result that other parts such as the bearings have had to be made large, so that overall the sensor becomes large and heavy, requiring a large space to house it in and causing a degradation in durability.

It is thereupon conceived that to form a rotating member a lighter magnetic member could be employed in place of the disk-shaped magnets, with a shaft arranged coaxially therein and the space therebetween filled with resin. However, it is not necessarily easy to firmly fasten the magnetic member to the shaft so that no slippage would occur therebetween, thus there is the problem of error arising in the detection output.

SUMMARY OF THE INVENTION

An object of this invention is to provide an angle-of-rotation sensor which is light and compact, can be contained in a small space and has good durability.

A further object of this invention is to provide an angle-of-rotation sensor comprised of a light, compact magnetic member within which a shaft is coaxially fixed by means of resin, producing a strong bond between shaft, resin and magnetic member so that there is no slippage therebetween.

To attain the aforesaid objectives, the present invention provides an angle-of-rotation sensor provided with a magnetic rotating member which rotates synchronously with the rotation of a subject shaft to be measured, and magneto electric transducer means arranged in opposition to the magnetic rotating member, the improvement comprises the magnetic rotating member being comprised of a magnetic ring and a shaft fixed coaxially therein by means of resin, and means rotational movement prevention is provided for preventing slip occurring between the magnetic ring and the shaft.

BRIEF DESCRIPTION OF THE DRAWINGS

These and other objects and advantages of the present invention will be more apparent from the following description and drawings in which:

FIGS. 4(a) to 4(j) are explanatory process views showing an example of the method of manufacturing the angle-of-rotation sensor shown in FIG. 1;

DESCRIPTION OF THE PREFERRED EMBODIMENTS

Embodiments of the angle-of-rotation sensor according to this invention will now be described with reference to the accompanying drawings.

Figure 1:
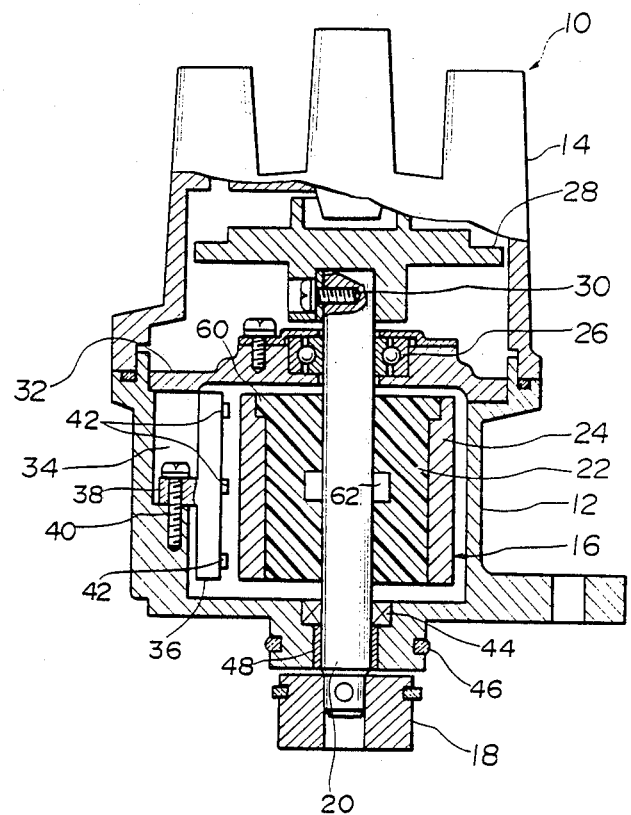
FIG. 1 is an explanatory cross-sectional view showing the angle-of-rotation sensor according to the present invention, provided as an example inside a distributor.

With reference to FIG. 1, an example of the angle-of-rotation sensor is shown provided within a distributor 10; a housing 12 and a distributor cap 14 that fits onto the upper part of the housing 12 form the casing of the distributor 10 within which a rotating member 16 is rotatably housed. The rotating member 16 is comprised of a shaft 20 coupled via a joint 18 to a camshaft (not shown) which rotates synchronously with the rotation of a crankshaft (not shown) of an internal combustion engine at one-half the revolutions thereof, and a magnetic ring 24, described hereinbelow, affixed on a shaft 20 coaxially therewith by means of a thermosetting resin 22 such as a phenol resin or the like. The rotating member 16 is supported by a bearing 26 inside the distributor 10 so as to be freely rotatable, and has at the upper end thereof a rotor 28 affixed thereto by a screw 30.

The magnetic ring 24 is rotatably located in a chamber 34 formed by a partition 32. A sensor board 36 in the chamber 34 which is separated from the outer peripheral surface of the magnetic ring 24 by a prescribed distance is fixed to the housing 12 by means of a bracket 38 and screws 40. The sensor board 36 is provided with three Hall elements 42 acting as the magneto electric transducer means, the Hall elements being arranged in opposition to magnetized zones formed on the magnetic ring 24. Although in this embodiment Hall elements are used for the magneto electric transducer means, it is to be understood that it would be precisely the same if magneto resistors or the like were used. The numeral 44 denotes an oil seal, 4 an O-ring and 48 a bearing metal.

Figure 2:
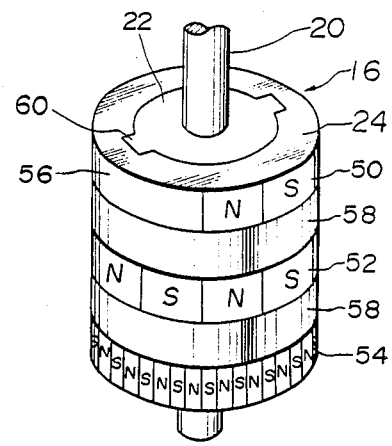
FIG. 2 is an explanatory perspective view of the rotating member of the angle-of-rotation sensor of this invention.

The rotating member 16 will now be described in further detail with reference to FIG. 2. The magnetic ring 24 which forms the rotating member 16 is tubular in shape, as shown, and has formed on the periphery thereof, in the direction of the axis of rotation of the magnetic ring 24, a plurality of magnetized zones. In the diagram, there are three such zones, a first magnetized zone 50, a second magnetized zone 52 and a third magnetized zone 54. On the circumference of these magnetized zones are formed an appropriate number of magnetic poles consisting of N poles and S poles. Assuming that the angle-of-rotation sensor according to the present invention is fitted to a 4-cylinder internal combustion engine, the first magnetized zone 50 will have one pair of poles, the second magnetized zone 52 will have four pairs of poles and the third magnetized zone 54 will have twenty-four pairs of poles (for ease of understanding the third magnetized zone is shown with fewer magnetic poles). As the first magnetized zone 50 has only one pair of magnetic poles, the remaining part has been made a non-magnetized portion 56. Non-magnetized zones 58 are interposed between the magnetized zones 50, 52 and 54; the presence of the nonmagnetized zones preventing mutual magnetic interference between the magnetized zones. Also, the width of each of the magnetized zones 50, 52 and 54 in the direction of the axis of rotation is made larger than the width of the magneto-sensitive surface of the Hall elements 42, easing the positioning task.

A characterizing feature of the present invention is that the magnetic ring 24 has insets 60 formed therein into which the resin 22 extends, increasing the strength of the bond between the magnetic ring 24 and the resin 22, in addition, a key 62 (FIG. 1) is inset into the shaft 20 so that a portion of the key 62 projects out from the shaft 20. The insets 60 and the key 62 serve to strengthen the bond between the magnetic ring 24, the resin 22 and the shaft 20, so that no slipping occurs therebetween and no error in output is produced.

Figure 3:
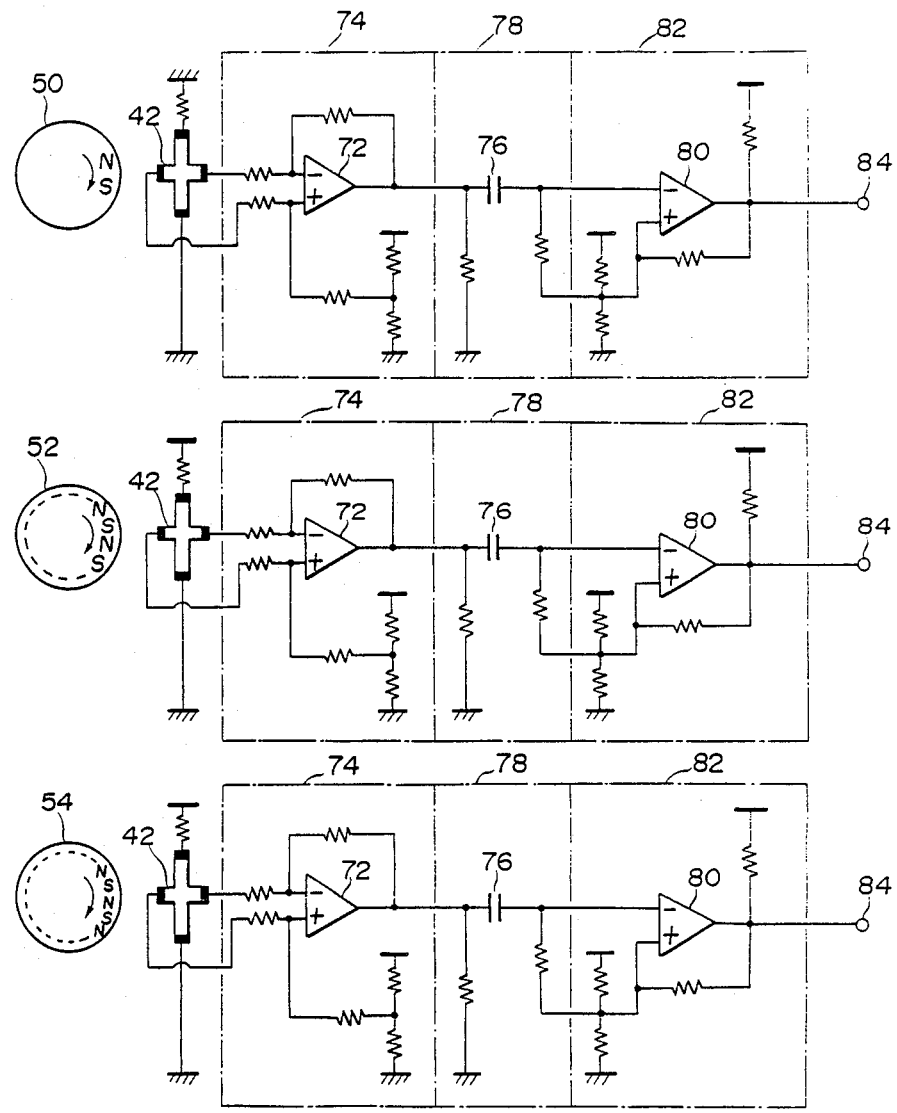
FIG. 3 is a block diagram of the detection circuit of the angle-of-rotation sensor shown in FIG. 1.

The functioning of the angle-of-rotation sensor according to the present invention will now be explained hereinbelow, with reference to FIG. 3. A sensor board 36 that is provided in the proximity of the rotating member 16 that rotates one-half revolution for every one revolution of an internal combustion engine crankshaft (not shown) is provided thereon with three Hall elements 42 in which an electric voltage is produced upon being subjected to the magnetic fields of the magnetized zones 50, 52 and 54 of the magnetic ring 24. The output of each of the Hall elements 42 is passed through an amplification circuit 74 that is provided with a differential amplifier 72, a direct current component filter circuit 78 provided with a coupling capacitor 76, and a comparator circuit 82 provided with a comparator 80, and is taken off via output terminals 84 and transmitted to an after-processing circuit (not shown). One pulse is obtained from the first magnetized zone 50 per crank revolution of 720 degrees for use as a cylinder discrimination signal, one pulse is obtained from the second magnetized zone 52 per crank revolution of 180 degrees for use as a piston TDC position signal, and one pulse is obtained from the third magnetized zone 54 per crank revolution of 30 degrees for use as a unit angle signal, and on the basis of these angle signals the internal combustion engine (not shown) may be controlled with good precision.

Figure 4A:
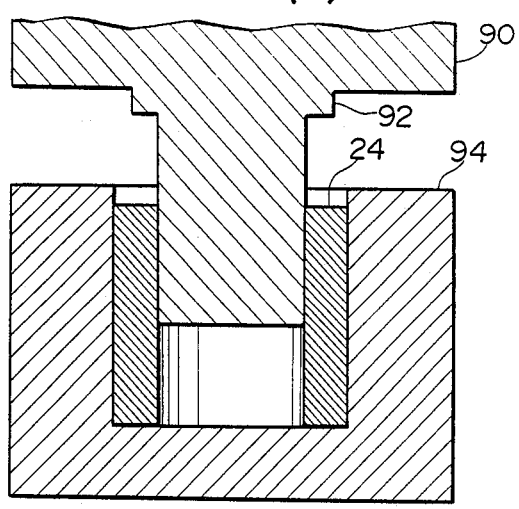
Figure 4B:
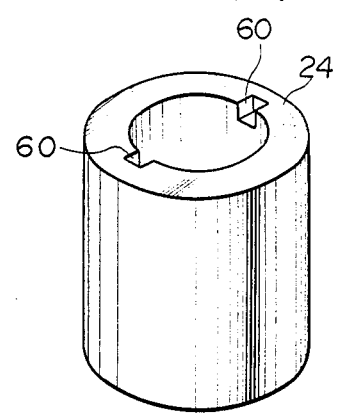

The method of manufacturing the angle-of-rotation sensor of this invention will now be described, with reference to FIGS. 4(a) to 4(j). A ferrite magnetic ring 24 which has not yet been magnetized is press-formed as shown in FIG. 4(a). By forming projections 92 on a press ram 90 the molded magnetic ring 24 is provided with two insets 60 (FIG. 4(b)). These insets 60 are formed only at one end of the magnetic ring, the other end being left flat to facilitate removal of the magnetic ring from a mold 94.

Figure 4C:
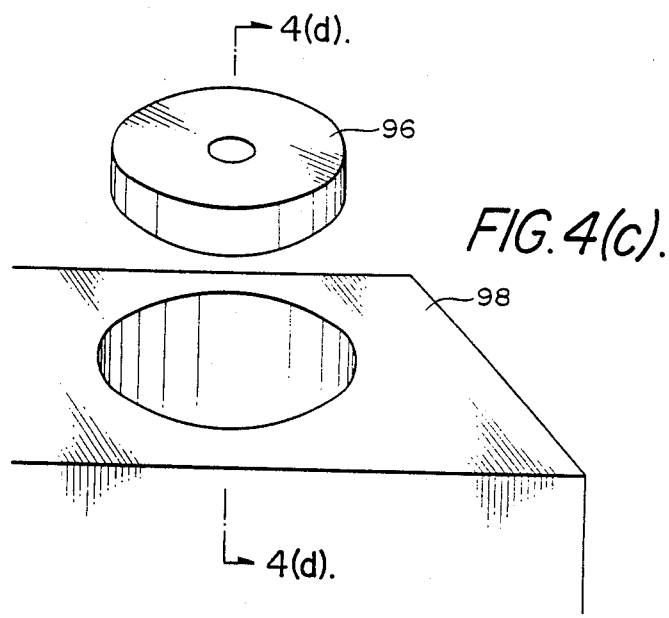
Figure 4D:
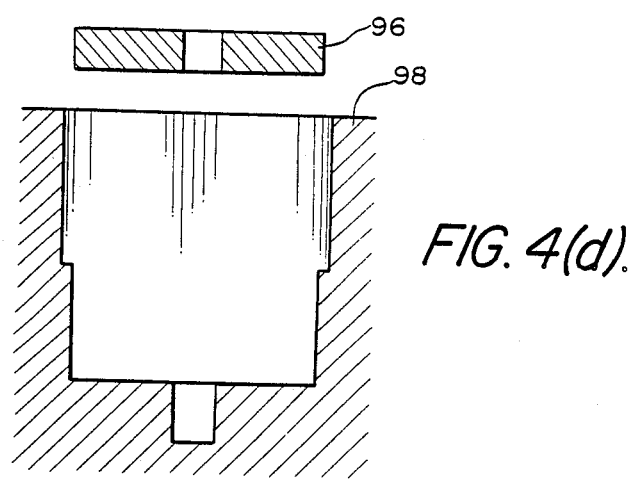

An upper die half 96 and a lower die half 98 are prepared (FIGS. 4(c) and 4(d)), and the magnetic ring 24, which has not yet been magnetized, and the shaft 20 are positioned in the lower die half 98, and the upper die half 96 is then placed in position. A molten plastic resin 22, such as for example a phenol resin, is then injected in via the inlet as shown in FIG. 4(f). After the resin 22 completely fills the interior (FIG. 4(g)), it is left to cool.

After removing the member from the die and using a lathe or the like to machine off the adhering resin (FIG. 4(h)) the rotating member of FIG. 4(i) is obtained. The rotating member is then completed by providing the magnetized zones and the non-magnetized zones on the magnetic ring (FIG. 4(j)). As shown, the resin 22 penetrates into the insets 60, forming a strong union when the resin sets.

The manufacturing process prior to the stage shown in FIG. 4(a) starts with the casting of the magnetic ring 24. The outer surface 24a (FIG. 4(e)) is then ground to achieve maximum roundness relative to the axis of the shaft 20 and facilitate the magnetization process. The inner surface 24b of the magnetic ring may be left in its rough, unground state. The casting process might give rise to an inherent error in the ring's shape (thickness) along its axis, producing a slight eccentricity, which may also be ignored. Thus, when the resin is inserted (FIGS. 4(f) and 4(g)), the bond strength and frictional resistance between the inner surface of the ring and the resin 22 is markedly greater than when the said surface is ground, and this is therefore one way of increasing the strength of the bond between the two. The slight eccentricity of the inner surface 24b relative to the axis of rotation can also contribute to the prevention of slippage between ring and resin. Owing to the eccentricity the center of gravity of the rotating member is slightly off, relative to the center of rotation, but the deviation is so small that in practice it does not pose a problem.

Figure 5:
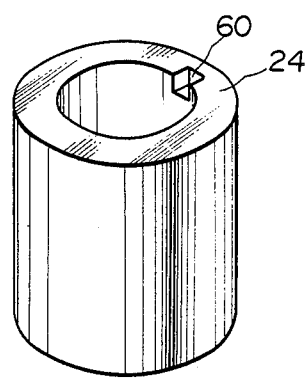
FIG. 5 is an explanatory perspective view of a magnetic ring of a second embodiment of the angle-of-rotation sensor according to this invention.

FIG. 5 shows a second embodiment of the angle-of-rotation sensor according to this invention, in which the edge of the magnetic ring is provided with only one inset 60.

Figure 6:
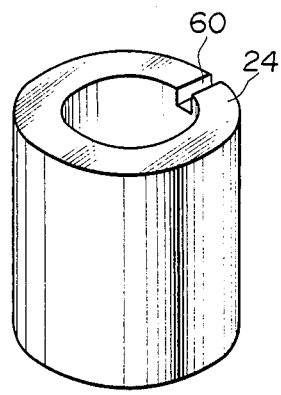
FIG. 6 is an explanatory perspective view of a magnetic ring of a third embodiment of the angle-of-rotation sensor according to this invention.

FIG. 6 shows a third embodiment of an angle-of-rotation sensor according to this invention. In this embodiment, the inset 60 is in the form of a crosscut on the top edge of the magnetic ring 24 that opens out on the outer surface of the ring. In this embodiment, the inset must be located in the non-magnetized portion 56.

Figure 7A:
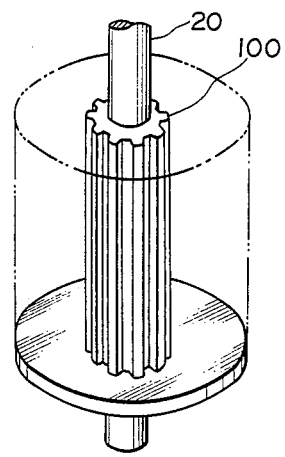
FIGS. 7(a) and 7(b) are explanatory perspective views of a rotating member of a fourth embodiment of the angle-of-rotation sensor according to this invention.
Figure 7B:
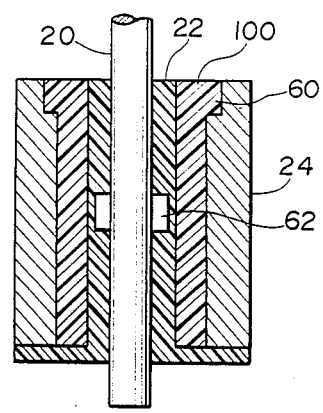

FIGS. 7(a) and 7(b) show a fourth embodiment of the angle-of-rotation sensor according to this invention. Here, the shaft 20 has been provided with a spline shaft 100. The spline shaft 100 is formed of plastic or the like and is fixed to the shaft 20 by the key 62. The merit of this embodiment is that the strength of the bond between the shaft 20 and the resin 22 is increased.

Figure 8:
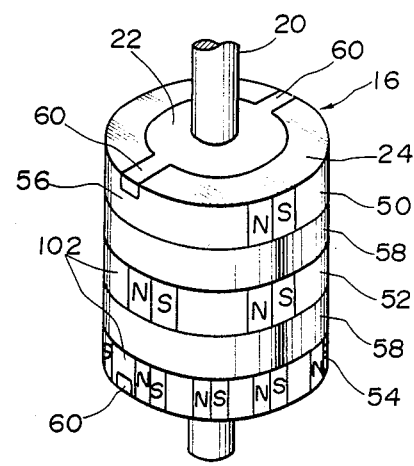
FIG. 8 is an explanatory perspective view of the rotating member of a fifth embodiment of the angle-of-rotation sensor according to this invention.

FIG. 8 shows a fifth embodiment of the angle-of-rotation sensor according to this invention. In this embodiment, of the three magnetized zones 50, 52 and 54 provided around the periphery of the magnetic ring 24, non-magnetized portions 102 are interposed between the magnetic poles of the the magnetized zones 52 and 54 to prevent magnetic interference between the said magnetic zones, and insets 60 are provided in the top zone 50 and bottom zone 54. The merit of this embodiment is that the strength of the bond between the magnetic ring 24 and the resin 22 is increased.

Figure 9:
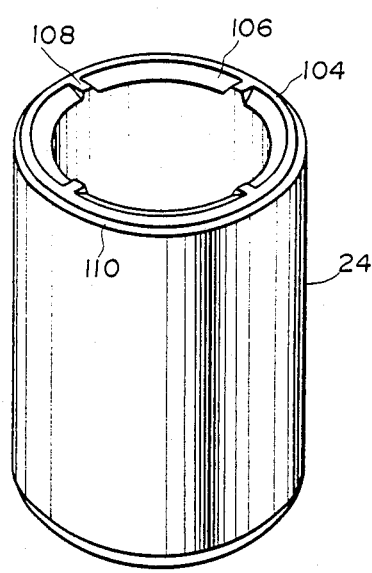
FIG. 9 is an explanatory perspective view of the magnetic ring of a sixth embodiment of the angle-of-rotation sensor according to this invention.
Figure 10:
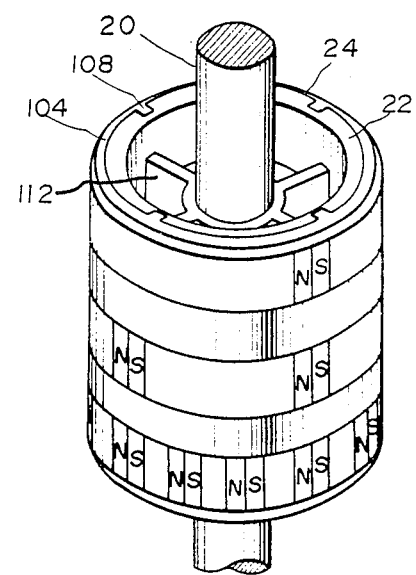
FIG. 10 is an explanatory perspective view of the rotating member used in the sixth embodiment.
Figure 11:
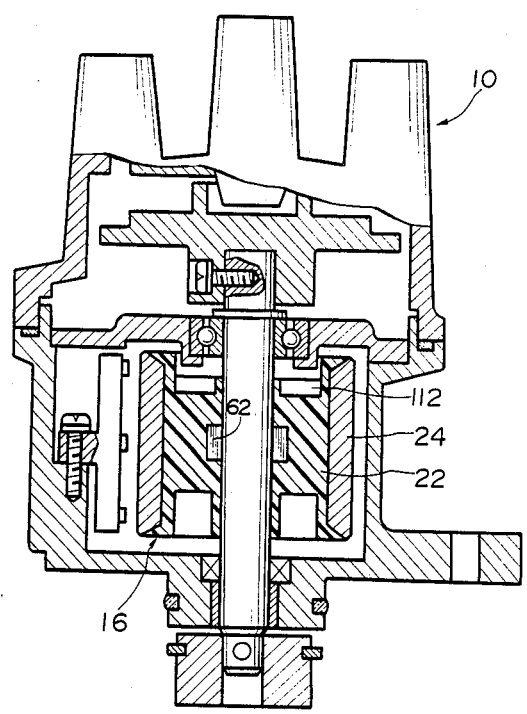
FIG. 11 is an explanatory cross-sectional view of the angle-of-rotation sensor of the sixth embodiment housed in a distributor.

FIGS. 9 to 11 show a sixth embodiment of the angle-of-rotation sensor according to this invention. In this embodiment, a flat narrow portion 104 is formed on the top edge of the magnetic ring 24 (FIG. 9). A sloping surface 106 is also formed that starts from the inner edge of the portion 104 and slopes down toward the center of the ring. Formed in the sloping surface 106 are four projections 108 that extend radially. The surface of the projections 108 and that of the portion 104 form an identical integral plane that is at right-angles to the ring wall. A chamfered portion 110 is formed on the outer edge of the portion 104. As the resin 22 penetrates as far as the sloping portion 106, the effect of the projections 108 formed in the sloping surface 106 is to prevent relative rotational motion between the magnetic ring 24 and the resin 22. The sloping portion 106 starts from midway across the face of the ring edge, and on the outer side thereof there is the narrow portion 104 and the projections 108 which have the same integral plane, so the resin 22 does not penetrate across the entire edge of the ring, which would increase the height (length) of the ring. Moreover, the chamfered portion 110 protects the ring edge from damage.

With reference to FIG. 10, to reduce the weight of this embodiment of the angle-of-rotation sensor, the amount of resin used and the length, the interior has been made hollow, with the resin 22 used only to form ribs 112 at each end of the magnetic ring 24. FIG. 11 is an explanatory cross-sectional view showing the angle-of-rotation sensor housed in the distributor 10. Because of the hollow structure, the bearing 26 can be brought inside the ring, reducing the space that is taken up inside the distributor. As there are no other differences compared with the first embodiment, further explanation of the embodiment is omitted.

Although the foregoing embodiments describe one or several insets, any number of insets may be used. Also, the various rotational movement prevention means described may be used singly or in combination. Though the angle-of-rotation sensor according to this invention has been described with reference to a sensor used in an internal combustion engine, it is not limited thereto but may be applied to angle-of-rotation detection in machine tools and other machinery and equipment.

While the above description discloses preferred embodiments of the invention, it is to be understood that numerous modifications or alterations may be made without departing from the scope of the invention as set forth in the following claims.

What is claimed is:

1. An angle-of-rotation sensor provided with a magnetic rotating member which rotates synchronously with the rotation of a subject shaft to be measured, and magneto electric transducer means arranged in opposition to said magnetic rotating member, the improvement comprising:

said magnetic rotating member is comprised of a shaft fixed coaxially within a tubular magnetic ring by resin, and rotational movement prevention means is provided for preventing slip occurring between the magnetic ring and the shaft, wherein at least one end of the magnetic ring is provided with inset portions into which the resin extends to form said rotational movement prevention means, wherein the edge face of at least one end of the magnetic ring slopes inwards toward the center of the ring, and projecting portions are provided at suitable locations on the edge face.

2. The angle-of-rotation sensor according to claim 1 wherein said projecting portions extend radially.

3. An angle-of-rotation sensor provided with a magnetic rotating member which rotates synchronously with the rotation of a subject shaft to be measured, magneto electric transducer means arranged in opposition to said magnetic rotating member, the improvement comprising:

said magnetic rotating member is comprised of a shaft fixed coaxially within a tubular magnetic ring by resin, and rotational movement prevention means is provided for preventing slip occurring between the magnetic ring and the shaft, wherein at least one end of the magnetic ring is provided with inset portions into which the resin extends to form said rotational movement prevention means, wherein the inset portion comprises a crosscut on the edge of the magnetic ring that extends to form an opening on the outer surface of the magnetic ring.

4. The angle-of-rotation sensor according to claim 3 wherein the opening is formed at a non-magnetized portion on the peripheral surface of the magnetic ring.

5. An angle-of-rotation sensor provided with a magnetic rotating member which rotates synchronously with the rotation of a subject shaft to be measured, magneto electric transducer means arranged in opposition to said magnetic rotating member, the improvement comprising:

said magnetic rotating member is comprised of a shaft fixed coaxially within a tubular magnetic ring by resin, and rotational movement prevention means is provided for preventing slip occurring between the magnetic ring and the shaft, wherein the inner surface of the tubular magnetic ring is in an unground state.

6. A position sensor for measuring the angular position of a rotating shaft, comprising:

a magnetic member which rotates synchronously with the rotation of the subject shaft to be measured, said magnetic rotating member having a shaft fixed coaxially within a tubular magnetic ring by resin, said magnetic ring being at, least, one end thereof with inset portions into which the resin extends to form rotational movement prevention means for preventing slip occurring between the magnetic ring and the shaft in such a manner that the edge face of said magnetic ring slopes inward toward the center to said ring and projecting portions are provided at suitable locations on the said edge face; and magneto electric transducer means arranged in opposition to said magnetic rotating member.

7. A position sensor according to claim 6, wherein said projecting portions extend radially.

8. A position sensor according to claim 6 or 7, wherein the inner surface of said magnetic ring is left unground.

9. A position sensor according to claim 6, wherein said shaft has a projection portion and said resin encircles the projection portion of said shaft.

10. A position sensor according to claim 6, wherein said magnetic ring is depressed at, at least, one end thereof.

11. A position sensor for measuring the angular position of a rotating shaft, comprising:
a magnetic rotating member which rotates synchronously with the rotation of the subject shaft to be measured, said magnetic rotating member having a shaft fixed coaxially within a tubular magnetic ring by resin, said magnetic ring being provided at, at least, one end with inset- portions into which the resin extends to form rotational prevention means for preventing slip occurring between said magnetic ring and the shaft, said inset portions comprising a crosscut on the edge of said magnetic ring that extends to form an opening on the outer surface of said magnetic ring; and
magneto electric transducer means arranged in opposition to said magnetic rotating member.

12. A position sensor according to claim 11, wherein the opening is formed at a non-magnetic portion on the peripheral surface of the magnetic ring.

13. A position sensor according to any of claim 11 or 12, wherein the inner surface of said magnetic ring is left unground.

14. A position sensor for measuring the angular position of a rotating shaft, comprising:
a tubular member comprised of a magnetic material and having a center shaft disposed coaxially thereto, said tubular member being rotatable synchronously with the rotation of the shaft to be measured through said center shaft, said tubular member having an inset portion at an end thereof and being left unground at its inner surface, said shaft having a portion projected axially therefrom;
plastic means bonding said tubular member to said shaft, said plastic means contacting the unground inner surface of the tubular member and extending to the inset portion while encircling the center shaft at the projected portion; and
magneto electric transducer means positioned on a member independent of the rotation of the tubular member for generating a signal indicative of the angular position of the shaft to be measured.

15. A position sensor according to claim 14, wherein said portion projected from the shaft comprises a keying means.

16. A position sensor according to claim 14, wherein said portion projected from the shaft comprises external splines formed on the shaft.

* * * * *